Nov. 6, 1962  M. A. WOODS  3,062,157
CARGO BRACING DEVICE

Filed March 14, 1960  2 Sheets-Sheet 1

INVENTOR:
MARQUIS A. WOODS
BY
ATT'YS

Nov. 6, 1962    M. A. WOODS    3,062,157
CARGO BRACING DEVICE
Filed March 14, 1960    2 Sheets-Sheet 2
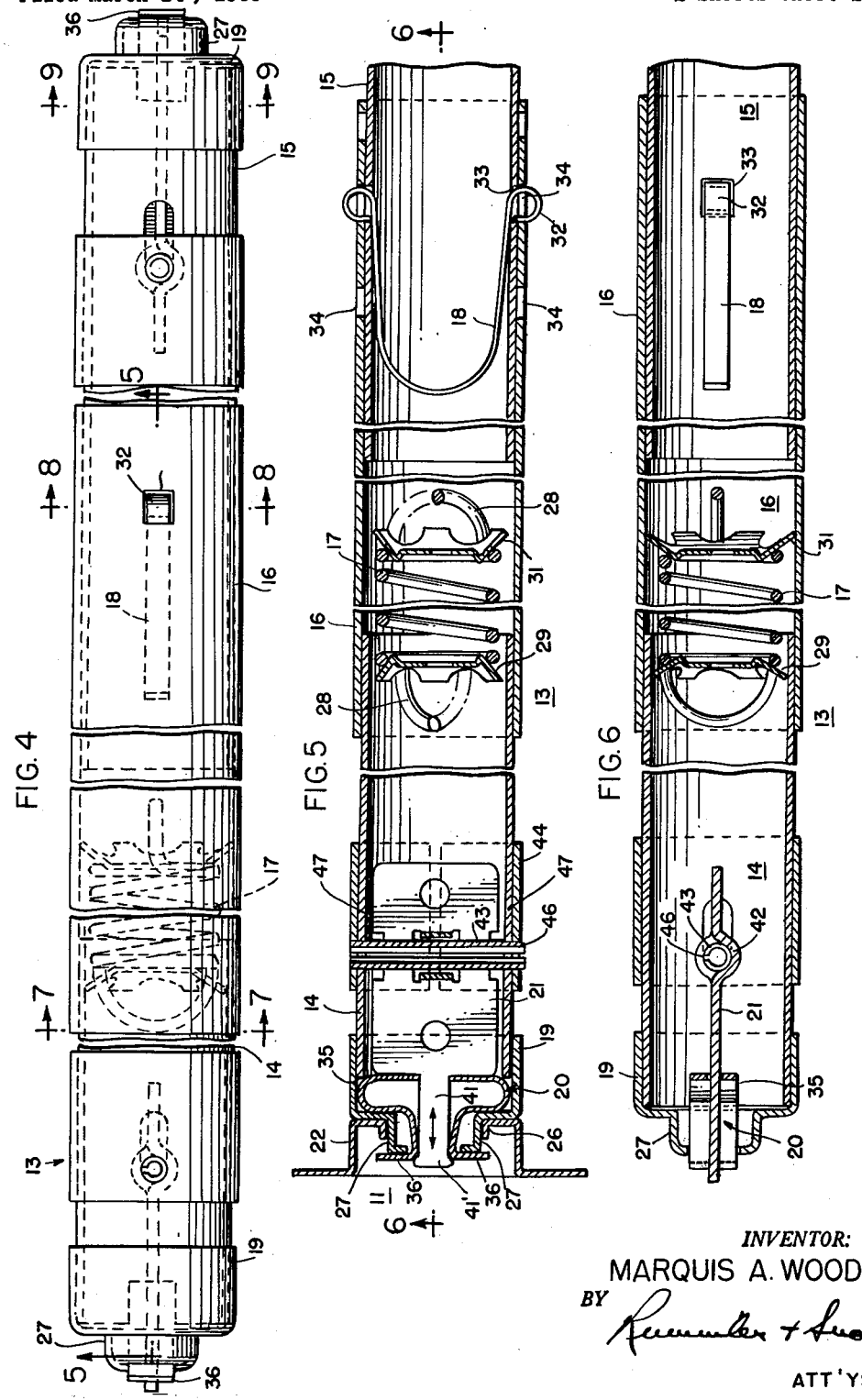
INVENTOR:
MARQUIS A. WOODS
BY
ATT'YS

United States Patent Office 3,062,157
Patented Nov. 6, 1962

3,062,157
CARGO BRACING DEVICE
Marquis A. Woods, 9208 W. Grand Ave.,
Franklin Park, Ill.
Filed Mar. 14, 1960, Ser. No. 14,619
5 Claims. (Cl. 105—369)

This invention relates to an adjustable device for bracing less-than-carload cargoes in unshiftable position in transport vehicles.

Large quantities of merchandise is transported from place to place in vehicles that contain separate consignments of less-than-carload lots, which consignments, at times, have to be loaded and/or unloaded at different points along the route of travel of the vehicle. It is imperative that each consignment be braced in place in the vehicle. Various devices have been developed for this purpose most, if not all, of which present some problems in their use.

The main objects of this invention are to provide an improved form of device for bracing cargoes in unshiftable position in transport vehicles; to provide an improved form of cargo bracing device wherein one or more sets thereof may be positioned with respect to a particular cargo; to provide an improved cargo bracing device having a plurality of identical extensible-contractable bracing members mounting automatically-acting manually-releasable end locks for removably securing the members at selected points in the vehicle and relative to the cargo to secure the cargo against shifting; to provide an improved form of belt rail for contactive use with the bracing members; and to provide an improved cargo bracing device of this kind of such simple structure as to make its manufacture very economical and its use extremely facile in practically any kind of a vehicle normally used for the transport of cargoes.

A specific embodiment of this invention is shown in the accompanying drawings in which:

FIG. 4 is a side view of one of the improved bracing members constructed in accordance with this invention for coactive use with the belt rails shown in FIGS. 1, 2 and 3;

FIG. 5 is a longitudinal, sectional view of a portion of the improved bracing member shown in FIG. 4, with one end thereof locked in position to one of the belt rails such as shown in FIGS. 1, 2 and 3;

FIG. 6 is a longitudinal sectional view of the bracing member, shown in FIG. 5, taken on the plane of the line 6—6 but omitting the supporting belt rail;

Figure 1:
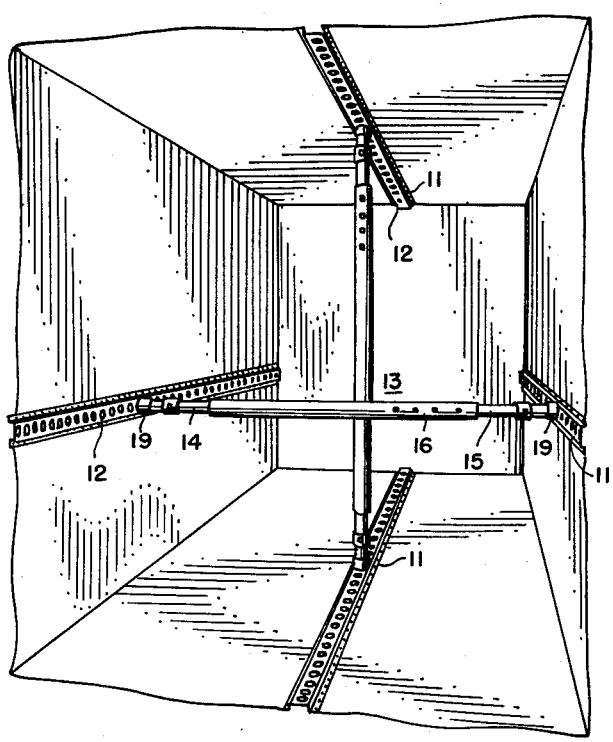
FIGURE 1 is a diagrammatic interior perspective of one end of a transport vehicle having positioned therein a cargo bracing device constructed in accordance with this invention.
Figure 2:
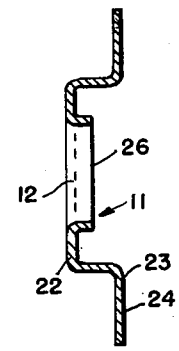
FIG. 2 is an enlarged, cross-section of one of the belt rails forming a part of this improved cargo bracing device.
Figure 3:
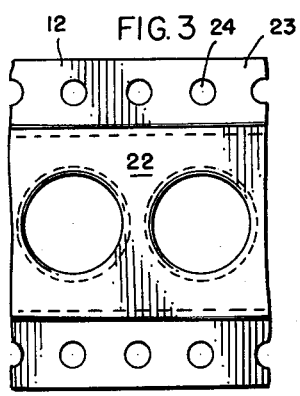
FIG. 3 is an enlarged, fragmentary face view of the same.
Figure 7:
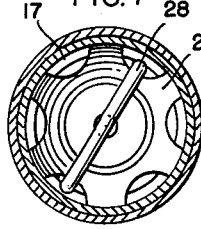
FIG. 7 is a cross-sectional view taken on the plane of the line 7—7 of FIG. 4.
Figure 8:
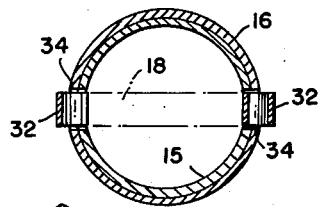
FIG. 8 is a cross-sectional view taken on the plane of the line 8—8 of FIG. 4.
Figure 9:
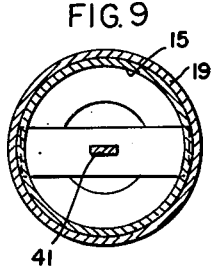
FIG. 9 is a similar view taken on the plane of the line 9—9 of FIG. 4.

The essential concept of this invention is to provide an improved brace member formed of a pair of end sections and an intermediate section telescopically arranged and resiliently urged toward a selective axially-extended relationship, each of the end sections mounting a slidable-key-controlled spring clip for releasably locking a trunnion-like end portion of the brace member to the inner margin of an annular opening of a belt rail secured to the wall of a vehicle for retaining the brace member in its installed position; and to provide a belt rail having a drawn inwardly projecting collar surround the openings in which the brace bar trunnions engage, to facilitate the locking feature.

An improved cargo bracing device embodying the foregoing concept comprises one or more pairs of belt rails 11, each having a longitudinal series of openings 12, and one or more rail-spanning brace members 13 each comprising a pair of end sections 14 and 15 telescopically supported on an intermediate section 16, one of which end sections and the intermediate section are normally urged by a spring 17 toward an axially extended relationship and the other of which end sections and the intermediate section are secured by a latch 18 in predetermined axially-extended relationship, the end sections 14 and 15 each mounting an end hub cap 19 embracing a spring clip 20 for locking the opposite ends of a brace member to pairs of belt rails 11 as controlled by manually-shiftable key plates 21.

The belt rails 11, as herein shown, are metal stampings of what might be called "hat-shape" cross-section. So formed, the middle portion 22 of the rail 11 is spaced outwardly from the plane of the oppositely-extending flanges 23. The flanges 23 have series of apertures 24 for the insertion of suitable fasteners (screws or nails) to secure the rails 11 in place on the inner walls of a vehicle "V" (FIG. 1). The holes 12 in the central portion 22 of the rails 11 are formed with inwardly-extending annular flanges or collars 26 of an internal diameter to fit a trunnion or hub 27 on either of the end caps 19 of a spanning brace 13.

The brace 13, comprising the herein-before-noted end sections 14 and 15, the intermediate section 16, the spring 17, the latch 18, is adapted for alterable axial extension so as to span a pair of opposed belt rails 11 with the hubs 27 of the end caps 19 seated in the belt-rail flanged openings 12 and locked thereto by the spring clips 20 controlled by the respective key plates 21, as presently will be explained more in detail.

The sections 14, 15 and 16, of the brace 13, here are shown as of tubular form with the end sections 14 and 15 telescopically supported in the intermediate section 16.

The spring 17, which normally urges the end section 14 and the intermediate section 16 into extended axial relationship, is a conventional compression spring. The end convolutions 28 are bent to be disposed in the axis of the spring and embracively support conventional star washers 29 and 31, respectively. These star washers 29 and 31 are formed of spring metal and are concave in cross-section. They are so dimensioned, respectively, that they may be inserted into the end section 14 and intermediate section 16—convex side first—to desired axial positions whereupon, under subsequent strain, the prongs will bite into the walls of the sections 30 so that the washers become fixed therein.

The latch 18 is a piece of flat, spring metal and here is shown in the form of a U with ends curled to form knobs 32 for seating in slots 33 and 34, of the sections 15 and 16 (FIGS. 4–6), respectively, to selectively determine the relative axial positioning of these two selections. Obviously, there is but one pair of diametrically-opposed slots 33 in the end section 15 through which the knobs 32 protrude. However, the intermediate section 16 has a series of diametrically-opposed slots 34 extending longitudinally along the sides of the section 16. The series of slots 34, receptive of the knobs 32 on the spring latch 18, permit a variation in the relative axial extension of the sections 15 and 16.

The end hub caps 19 seat over the outer ends of the sections 14 and 15, and are held thereon by spot welding, so that the hubs 27 may be inserted into the flanged openings 12 in the belt rails 11, when the ends 36 of the spring clips 20 are contracted by the retraction of the key plate 21.

Figure 10:
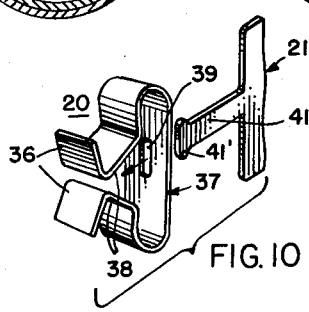
FIG. 10 is an exploded perspective of the lock spring and control key whereby the ends of the bracing member are secured in or released from locked relationship to the belt rails.

Each of the spring clips 20, as is most clearly shown in FIG. 10, is a strip of spring metal bent to form a back-to-back S-shaped elongated loop base part 37, a contracted neck part 38 and the oppositely-extending ends 36. The loop base part 37 has a slot 39 for the reception of a stem 41 on the key plate 21. The ends 36 extend oppositely outward in a common radial plane spaced from the plane of the base part 37 axially of the respective hub cap 19. Each spring clip 20 is set in diametrically-opposed recesses 35 (FIGS. 5 and 6) in the ends of the respective end sections 14 and 15, the ends of the base portions 37 of the spring clip being welded to the respective end sections 14 and 15 to secure the spring clip against displacement when operated by the key plate 21.

Each key plate 21 is formed from a flat strip of rigid metal with an outwardly-extending stem 41 and is mounted on a post 43 secured to sleeeve 44 externally-shiftable on the respective end sections 14 and 15. The shifting the sleeve 41 and interposition of the head 41' into and of position between the neck part 38 of the spring clip 20 to effect the expansion or contraction respectively of the fingers 36 of the clip 20.

Each key plate 21 has a middle portion 42 struck out from opposite faces to form a bearing for the "split pin" supporting post 43. This post 43 is a section of small-diameter spring-metal tubing with a longitudinal slit 46 extending from end to end (FIGS. 5 and 6). The post 43 is compressible radially to permit inserting it through apertures in the sleeve 44 and through the offset portions 42 of the plate 21. Upon releasing the compressed post 43 it will expand into retentive relationship with the sleeve 44 on opposite sides of the respective end sections 14 and 15. Axial slots 47 (FIG. 5) in the opposite sides of the respective sections 14 and 15 embrace the posts 43 and permit a limited axial shifting of the sleeeves 44 on the respective end sections. These slots 47, in length and position, determine the limits of the opposite shifting of the sleeeve 41 and interposition of the head 41' into and withdrawal from the neck part 38 of the spring locking clip 20.

A brace 13 is assembled in the following manner: The star washer 29 is set in the spring end 28 and the spring 17 and washer (convex face first) are drawn in from the left end of the end section 14 to locate the washer 29 adjacent the opposite end of the end section 14. The intermediate section 16 is then inserted over the left end of the section 14 and pulled along the same and over the star washer 31, embraced in the spring end 28, until the washer 31 is at a desired position in the intermediate section 16. Next the end section 15, with the latch 18 in place, is inserted from the right into the intermediate section 16 until the knobs 32 on the latch 18 snap into the desired pair of slots 34 in the intermediate section 16.

The sleeves 44 are then set over the ends of the respective end sections 14 and 15 and the key plates 21 are inserted into the end sections 14 and 15. By bringing the openings between the offset portions 42 and of the plates 21 and the slots 47 in the sleeves 44 into alinement with the slots 47, the compressed split-pin posts 43 may be inserted into these respective openings and released. Thereupon, the key plates 21 and the actuating sleeves 44 will be operatively connected. Either at this point or previously, the spring clips 20 are set in the recess 35 in the respective end sections 14 and 15 and bonded thereto. Next the end caps 19 are set over the ends of the end sections 14 and 15. This is done with the fingers 36 of the spring clip 21 compressed to more or less parallel relationship so as to pass through the openings in the ends of the respective hubs 27 on the end caps 19. After this positioning of the hub caps 19, the fingers 36, of the spring clips 21, are disposed oppositely outwardly as shown in the drawings. The hub caps 19 are then secured to the respective end sections.

To make a vehicle V ready for the use of this improved cargo bracing device, pairs of the belt rails 11 have to be secured to the walls of the vehicle, somewhat as shown in FIG. 1. Depending upon the kind of cargoes that are likely to be transported by a vehicle V, one or more pairs of rails 11 are secured in place. This is done by the use of suitable fasteners—nails or screws—extended through the apertures 24 in the flanges 23.

The cargo being loaded, one or more pairs of the braces 13 are arranged in transverse relationship, as indicated in FIG. 1.

In positioning the brace 13, the first operation is to determine the relative axial relationship of the end section 15 and the intermediate section 16 so that the overall length of the brace 13, between the hubs 27 on the respective end caps 19, as established by the action of the spring 17, is greater than the distance between the middle portions 22 of opposed belt rails 11. The desired relative axial positioning of the end section 14 and the intermediate section 16 is effected by depressing the knobs 32 on the latch 18 and shifting the sections 14 and 16 to as near the desired axial relationship permitted by the seating of the knobs 32 in an opposed pair of slots 34 in the intermediate section 16.

The key plates 21, at the opposite ends of a brace 13, are retracted by shifting the sleeves 44 inwardly toward each other. This permits a normal retraction of the fingers 36 so that they will enter the flanged openings 12 in the belt rails 11.

The spring 17 will yield to a pressing inwardly of the sections 14 and 16 so that the over-all axial length of the brace 13—between the spring ends 36 at opposite ends of the brace—will be enough less than the distance between the parts 22 of the opposed belt rails 11 to permit one set of springs 16, and the contiguous hub 27 on the end cap 19, to be inserted into an opening 12 in one belt rail 11 and then allow the other pair of spring ends 36 and the contiguous hub 27 on the opposite end cap 19 to be inserted into an opening 12 in the opposite rail 11. The release of pressure against the spring 17 will cause it to extend the axial relationship of the sections 14, 15, and 16 so that the end caps 19 will be pressed firmly against the belt rails 11 (FIGS. 1 and 5).

A brace 13 being so positioned, the sleeves 44 are shifted outwardly away from each other. This moves each key plate 21 to shift the headed stem 41 outwardly through the neck parts 38 of the respective spring clips 21 so as to force the fingers 36 outwardly and lock the ends of the brace 13 to the respective rails 11. The brace 13 now will have both ends locked to the respective rails 11. Securing two or more such braces in place will insure a cargo against shifting.

When it is desired to remove a brace 13, it requires only a shifting of the sleeves 44 inwardly toward each other. This retracts the stems 41 on the key plates 21 and allows the fingers 36 to contract whereupon a telescoping of the sections 14 and 16 toward each other will compress the spring 17 and allow the withdrawal of the contracted fingers 36 and hubs 27 from the openings 12 in the belt rails 11.

The main advantages of this invention reside in the improved telescoping cargo brace construction which permits the device to be easily manufactured of relatively simple and less costly components than in the case of prior constructions; in the substantially universal adaptability of the brace device for use in vehicles of different sizes; and in the simple, but positive, locking means by which the ends of the brace device are locked to the respective belt rails. Further advantages are to be found in the improved form of belt rail which not only provides greater strength against transverse collapse but also provides a rigid collar which is engaged axially by the brace bar locking fingers to secure the brace bar against displacement by weaving of the vehicle walls.

Although but one specific embodiment of this invention has been herein shown and described it will be understood that details of the construction shown may be altered or omitted without departing from the spirit of the invention as defined by the following claims.

I claim:

1. A cargo bracing device for use with supporting rails having longitudinal series of openings said device comprising, a pair of tubular end sections telescopically supported on a tubular intermediate section, a compression spring interposed between the intermediate and one end section and biasing them toward axially-extended relationship, means for manually fixing the relative axial relationship of the intermediate and other end section, an open ended annular hub on the end of each end section dimensioned to fit in and rest on the rail openings, a looped leaf spring fixed on each end section inwardly of each hub with the medial portions of the spring extending axially outwardly through the respective hub with the spring ends turned at substantially right angles and oppositely-disposed in a common plane at the hub end, said spring ends each being of a length not greater than the radius of the hub, the medial spring portions being biased towards each other to normally contract the spring ends to a radial distance substantially within the periphery of the hub, a key plate shiftably supported within each section adjacent the respective hub and manually-actuatable axially of the section for interposition between the medial spring portions to separate the spring the spring ends to a radial distance greater than the external diameter of the hub, and a sleeve slidable axially on the exterior of each section and having means extending diametrically through each section for operative connection with the respective key plate.

2. A cargo bracing device for use with supporting rails having longitudinal series of flanged openings and comprising, a pair of tubular end sections telescopically supported on a tubular intermediate section, a compression spring interposed between the intermediate and one end section and biasing them toward axially-extended relationship, a U-shaped spring embraced within the other end section and having the ends thereof formed with knobs each extending out through a slot in the other end section and through one of a series of registering slots in the intermediate section, the knob ends of the spring being manually depressible to permit relative axial shifting of the intermediate and other end sections to predetermine their axially-extended relationship, a hub on the end of each end section dimensioned to fit in and rest on the flanged rail openings, a looped leaf spring fixed on each end section inwardly of each hub with the medial portions of the spring extending outwardly through the respective hub with the spring ends oppositely-disposed in a common plane at the hub end, the medial spring portions being biased to contract the spring ends to a radial distance less than the outside diameter of the hub, and a key plate shiftably supported on each section adjacent the respective hub and manually-actuatable for interposition between the medial spring portions to separate the spring ends to a radial distance greater than the external diameter of the hub, whereby to lock the brace to the rails.

3. A cargo bracing device for use with supporting rails of flanged channel-shaped cross-section having longitudinal series of flanged openings in the medial portion and comprising, a pair of tubular end sections telescopically supported on a tubular intermediate section, a compression spring interposed between the intermediate and one end section and biasing them toward axially-extended relationship, a U-shaped spring embracing within the other end section and having the ends thereof formed with knobs each extending out through slots in the other end section and through one of a series of registering slots in the intermediate section, the knob ends of the spring being manually depressible to permit relative axial shifting of the intermediate and other end sections to predetermine their axially-extended relationship, a looped leaf spring fixed to the end of each end section with the medial portions of the spring constricted to form a neck portion with the free ends of the spring extending oppositely outwardly in a common radial plane, a hub cap embracively positioned over the end of each end section and enclosing the respective looped leaf spring with the medial portions thereof extending outwardly through the hub and disposing the free ends of the spring in a common radial plane against the hub to hold the hub cap in place on the respective end section, and a key plate axially shiftable in each end section for contact with the respective looped spring to control the expansion and contraction of the medial portions thereof to lock the brace to or release it from the rails.

4. A cargo bracing device for use with supporting rails of flanged channel-shaped cross-section having longitudinal series of flanged openings in the medial portion and comprising, a pair of tubular end sections telescopically supported on a tubular intermediate section, a compression spring interposed between the intermediate and one end section and biasing them toward axially-extended relationship, a U-shaped spring embraced within the other end section and having the ends thereof formed with knobs extending out through slots in the other end section and through one of a series of registering slots in the intermediate section, the knob ends of the spring being manually depressible to permit relative axial shifting of the intermediate and other end sections to predetermine their axially-extended relationship, a looped leaf spring fixed to the end of each end section with the medial portions of the spring constricted to form a neck portion with the free ends of the spring extending oppositely outwardly in a common radial plane, a hub cap embracively positioned over the end of each end section and enclosing the respective looped leaf spring with the medial portions thereof extending outwardly through the hub and disposing the free ends of the spring in a common radial plane against the hub to hold the hub cap in place on the respective end section, a sleeve slidably mounted on each end section inwardly of the hub cap, a post secured to the sleeve and extending diametrically across the sleeve through elongated slots in the end section, a plate swivelled to the post within the respective end section and having a stem extending forwardly thereof for projection between the neck portion of the respective looped spring to control the expansion and contraction thereof to lock the brace to or release it from the rails.

5. A cargo bracing device for use with supporting rails having longitudinal series of openings and comprising, a pair of telescopically-supported sections, a compression spring interposed between the sections and biasing them toward axially-extended relationship, a hub on the outer end of each section dimensioned to fit in and rest on the rail openings, a looped leaf spring fixed on each section inwardly of each hub with the medial portions of the spring extending outwardly through the respective hub with the spring ends oppositely-disposed in a common plane at the hub end, the medial spring portions being biased to normally contract the spring ends to a radial distance less than the outside diameter of the hub, an external sleeve slidably mounted on and adjacent the end of each section inwardly of the respective hub, a post secured to the sleeve and extending diametrically across the sleeve through elongated slots in the wall of the respective section, a plate swivelled to the post within the said section and having a stem extending axially outwardly thereof for projection between the medial portions of the spring to separate the spring ends to a radial distance greater than the external diameter of the hub to lock the brace to the rails when the hub is fitted into an opening thereof.

References Cited in the file of this patent

UNITED STATES PATENTS

| | | |
|---|---|---|
| 947,584 | Armstrong | Jan. 25, 1910 |
| 1,425,618 | Vodicka | Aug. 15, 1922 |
| 1,478,343 | Looney | Dec. 18, 1923 |
| 2,118,729 | Hogan | May 24, 1938 |
| 2,317,315 | Wallace | Apr. 20, 1943 |
| 2,561,098 | Cole | July 17, 1951 |
| 2,608,420 | Eck | Aug. 26, 1952 |
| 2,622,298 | Macedo | Dec. 23, 1952 |
| 2,725,826 | Tobin et al. | Dec. 6, 1955 |
| 2,900,925 | Dunlap | Aug. 25, 1959 |